US006600666B2

(12) United States Patent
Lott et al.

(10) Patent No.: US 6,600,666 B2
(45) Date of Patent: Jul. 29, 2003

(54) HOLDING DEVICE FOR A CABLE HARNESS

(75) Inventors: Thomas Lott, Buehl (DE); Reinhard Fassel, Heilsbronn (DE); Robert Schleicher, Rednitzhembach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/141,200

(22) Filed: May 7, 2002

(65) Prior Publication Data

US 2002/0176241 A1 Nov. 28, 2002

(30) Foreign Application Priority Data

May 8, 2001 (DE) .................................... 201 07 758 U

(51) Int. Cl.[7] ................................................ H02B 1/20

(52) U.S. Cl. ...................... 361/826; 361/827; 361/747; 439/620; 439/79

(58) Field of Search ................................ 361/826, 827, 361/801, 747, 748; 439/620, 379, 79, 676

(56) References Cited

U.S. PATENT DOCUMENTS 4,880,397 A * 11/1989 Dawson, Jr. et al. ....... 439/620
4,903,403 A * 2/1990 Brown et al. ................. 29/861
6,390,834 B1 * 5/2002 Hofmeister et al. ........ 439/140

* cited by examiner

*Primary Examiner*—David Martin
*Assistant Examiner*—Hung Bui
(74) *Attorney, Agent, or Firm*—Kenyon & Kenyon

(57) ABSTRACT

A holding device for a cable harness is designed in such a way that the cable harness, which is attached on one side to a printed circuit board, remains undamaged during transportation of the printed circuit board to a final assembly location. A plug connector attached to the printed circuit board has dome-shaped latching elements, and a unit plug attached to a free other end of the cable harness has corresponding counter latching elements as direct parts of the holding device. By snapping the counter latching elements onto the latching elements, the unit plug is attached to the plug connector, and the holding device for the cable harness is closed. At the final assembly location, the counter latching elements are nondestructively detached from the latching elements by pulling the unit plug off of the plug connector, and the holding device is reopened from the secured transport position for the cable harness. The holding device is preferably intended for use in the automobile industry.

8 Claims, 2 Drawing Sheets

HOLDING DEVICE FOR A CABLE HARNESS

FIELD OF THE INVENTION

The present invention relates to a holding device for a cable harness which is attached at one end to a printed circuit board provided with a plug connector. A unit plug is attached to an exposed other end of the cable harness.

BACKGROUND INFORMATION

A preassembled unit made of a printed circuit board, the cable harness attached on one side, and the unit plug is to be transported to the final assembly location, where the printed circuit board is inserted into an assigned receiver and the unit plug is connected to a unit, for example a clutch actuator of a motor vehicle.

On the transport path to the final assembly location, the cable harness, which is attached on only one side to the printed circuit board, may be unintentionally damaged since the unit plug is a suspended mass attached to its free end, which, in the event of movements and changes in position, may pull the cable harness along into positions in which there is a danger of damage.

SUMMARY OF THE INVENTION

The holding device for a cable harness according to the present invention has the advantage in relation to the related art that the deficiency described above is avoided.

For this purpose, a latching element is implemented on the plug connector attached to the printed circuit board and a counter latching element corresponding to the latching element is implemented on the cable harness plug.

With the coupling of the latching element and counter latching element, the cable harness is also indirectly fixed in a detachable way on its end carrying the cable harness plug and therefore a holding device for the cable harness is provided. In this way, damage to the cable harness, particularly on the way to the final assembly location, is avoided.

DETAILED DESCRIPTION

Figure 1:
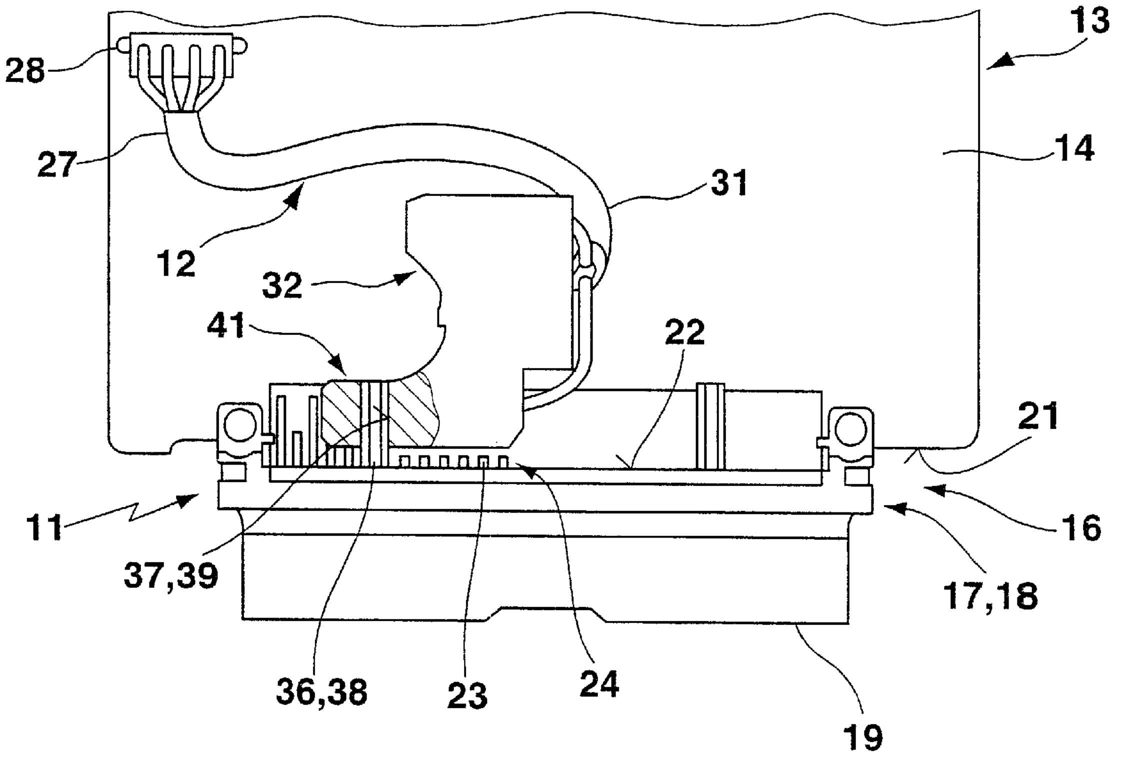
FIG. 1 shows a top view of a printed circuit board having a plug connector, a cable harness, and a unit plug, the parts of a holding device for the cable harness embodied on the unit plug and the plug connector being joined.
Figure 2:
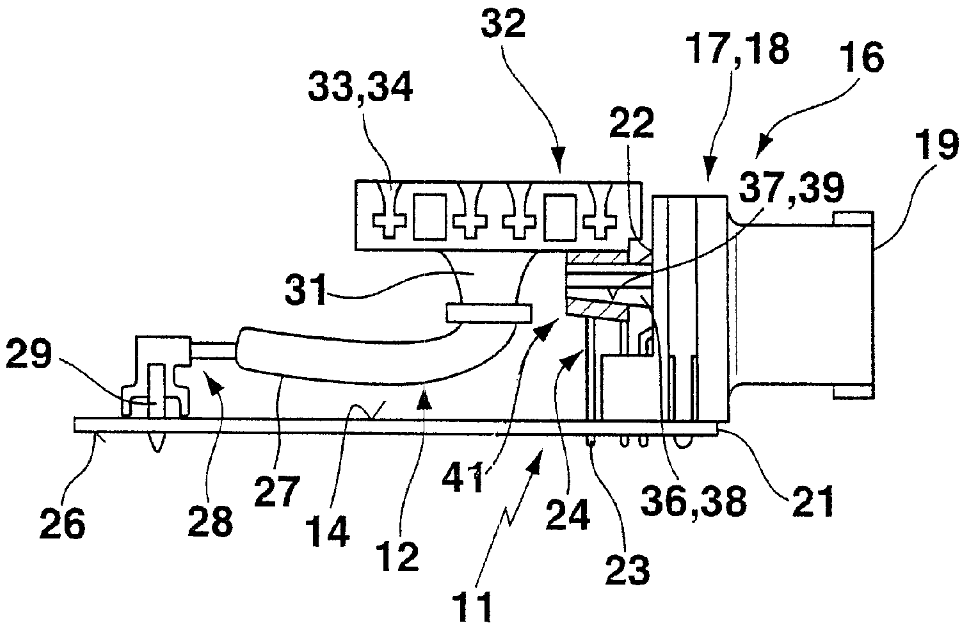
FIG. 2 shows a side view of the printed circuit board of FIG. 1.

A holding device 11 for a cable harness 12 shown in FIGS. 1, 2 is connected to a printed circuit board 13. A plug connector 16 is attached to a component side 14 of printed circuit board 13.

Plug connector 16 has, as is typical, a contact carrier 17 made of plastic, which is in one piece with a housing 18 of plug connector 16. Terminal shafts 19 of plug connector 16 for assignable mating connectors, not shown, project over an edge 21 of printed circuit board 13.

Facing away from terminal shafts 19, terminal sections 23 of contact parts 24 of plug connector 16, which are subdivided into groups, project out of a back 22 of plug connector 16. These terminal sections 23 are each directed toward component side 14 after a perpendicular bend and their ends are guided through holes of printed circuit board 13 to a solder side 26 of printed circuit board 13, where they are fixed through material bonding by a soldering process. Plug connector 16 is permanently connected to printed circuit board 13 by this fixing and further connecting elements, not shown in more detail.

Furthermore, one end 27 of cable harness 12 is attached to printed circuit board 13. For this purpose, cable harness 12 has a terminal plug 28 on this one end 27, whose pins 29 are fixed on printed circuit board 13 in the same way as terminal sections 23.

A unit plug 32 is attached to an exposed other end 31 of cable harness 12. For this purpose, cable harness 12 is connected to contact elements 33 of unit plug 32, which are inserted into receiving chambers 34 of unit plug 32, which run parallel to one another.

For holding other end 31 of cable harness 12, latching elements 36 are attached to plug connector 16 and assignable counter latching elements 37 are attached to unit plug 32 as direct parts of holding device 11.

Latching elements 36 are each implemented as a dome 38 and project perpendicularly out of back 22 of plug connector 16, running parallel in their longitudinal extension to component side 14. Latching elements 36 are implemented as slightly conical in their longitudinal course, the cross-sectional surface of the respective free end being smallest.

Counter latching elements 37 are each implemented as an opening 39, corresponding to an assigned dome 38, on a projecting auxiliary carrier 41 on unit plug 32. The longitudinal extension of openings 39 runs transverse to the longitudinal extension of receiving chambers 34 of unit plug 32, in which contact elements 33 are mounted, to which cable harness 12 is connected.

By snapping counter latching elements 37 onto assigned latching elements 36, unit plug 32 is attached to plug connector 16 and therefore holding device 11 for cable harness 12 is closed. Other end 31 of cable harness 12 is therefore indirectly fixed to plug connector 16 via unit plug 32.

With the arrangement of holding device 11 designed in this way, cable harness 12 runs over printed circuit board 13 essentially parallel to component side 14 of printed circuit board 13, so that cable harness 12 is securely held in a defined position during transportation of the preassembled unit including printed circuit board 13, cable harness 12, and unit plug 32 to the final assembly location.

Figure 3:
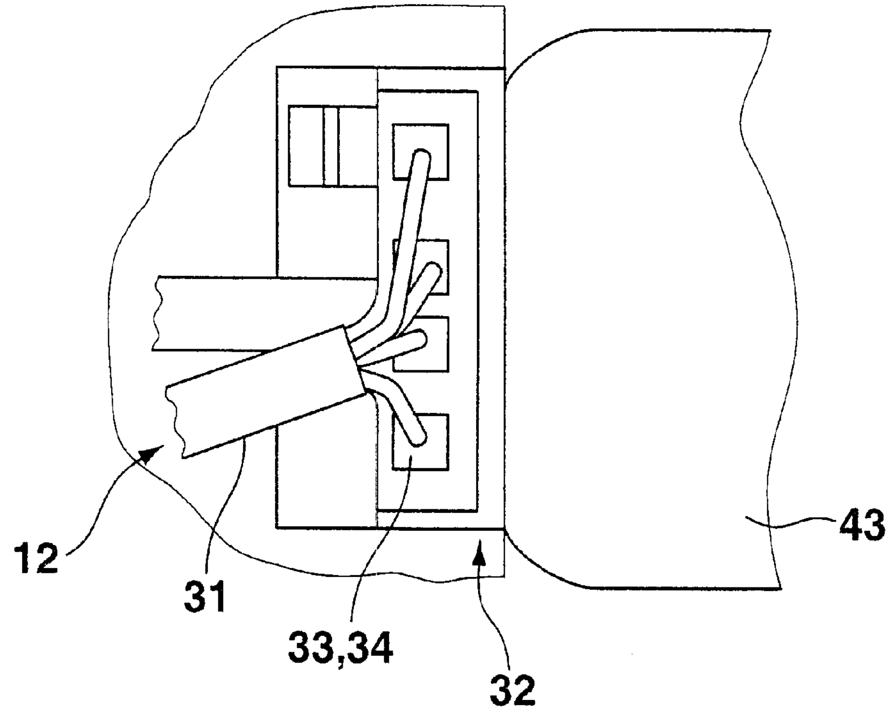
FIG. 3 shows the holding device that is detached and shows the unit plug in a bottom view, finally mounted on a unit of a motor vehicle.

At the final assembly location, counter latching elements 37 are nondestructively separated from latching elements 36 by pulling unit plug 32 off of plug connector 16 and, with the introduction of printed circuit board 13 into an assigned receiver and, as shown in FIG. 3, with the connection of unit plug 32 to a fixed unit 43, cable harness 12 is brought from the secured transport position into a position of normal use now fixed in this way.

Domes 38 may also alternatively be used as holding elements for shielding elements, for example of printed circuit board 13.

What is claimed is:

1. A holding device for a cable harness, the cable harness having one end fixed to a printed circuit board carrying a plug connector, the cable harness further having an exposed other end, the holding device comprising:

a unit plug for connection to a unit on the exposed other end of the cable harness;

a counter latching element situated on the unit plug; and at least one latching element attached to the plug connector, the latching element being adapted to be coupled to the counter latching element for at least indirectly, detachably fixing the cable harness to the plug connector.

2. The holding device according to claim 1, wherein the latching element includes a dome having a longitudinal extension running parallel to a component side of the printed circuit board.

3. The holding device according to claim 2, wherein the dome is conical and has a cross-sectional surface that is smallest at a free end.

4. The holding device according to claim 3, wherein another end of the dome projects out of a back of the plug connector situated over the printed circuit board.

5. The holding device according to claim 1, wherein the counter latching element has an opening on the unit plug, a longitudinal extension of the opening running transversely to a longitudinal extension of receiving chambers of the unit plug.

6. The holding device according to claim 5, wherein the cable harness runs over the printed circuit board substantially parallel to a component side of the printed circuit board, and further comprising contact elements mounted in the receiving chambers, the cable harness being connected to the contact elements.

7. The holding device according to claim 6, wherein the opening is situated in a projecting auxiliary carrier of the unit plug.

8. The holding device according to claim 1, wherein the latching element and the counter latching element are adapted to be disconnected nondestructively.

* * * * *